(12) United States Patent
Calmer

(10) Patent No.: US 12,150,410 B2
(45) Date of Patent: Nov. 26, 2024

(54) TWELVE BLADED STALK ROLL

(71) Applicant: CALMER HOLDING COMPANY, LLC, Lynn Center, IL (US)

(72) Inventor: Marion Calmer, Alpha, IL (US)

(73) Assignee: CALMER HOLDING COMPANY, LLC, Lynn Center, IL (US)

( * ) Notice: Subject to any disclaimer, the term of this patent is extended or adjusted under 35 U.S.C. 154(b) by 0 days.

(21) Appl. No.: 18/647,960

(22) Filed: Apr. 26, 2024

(65) Prior Publication Data

US 2024/0292786 A1 Sep. 5, 2024

Related U.S. Application Data

(63) Continuation of application No. 16/789,147, filed on Feb. 12, 2020, now Pat. No. 11,997,950, which is a continuation of application No. 29/680,011, filed on Feb. 12, 2019, now Pat. No. Des. 1,023,700.

(51) Int. Cl.
| | |
|---|---|
| *A01D 47/00* | (2006.01) |
| *A01D 34/44* | (2006.01) |
| *A01D 45/02* | (2006.01) |

(52) U.S. Cl.
CPC .......... *A01D 45/025* (2013.01); *A01D 34/44* (2013.01); *A01D 45/021* (2013.01); *A01D 47/00* (2013.01)

(58) Field of Classification Search
CPC ..... A01D 45/021; A01D 45/025; A01D 47/00
See application file for complete search history.

(56) References Cited

U.S. PATENT DOCUMENTS

| | | | |
|---|---|---|---|
| 730,671 | A | 6/1903 | Luce |
| 799,237 | A | 9/1905 | Jones |
| 1,429,168 | A | 9/1922 | Scott |
| 1,456,569 | A | 5/1923 | Reece et al. |

(Continued)

FOREIGN PATENT DOCUMENTS

| | | |
|---|---|---|
| CN | 106922294 A | 7/2017 |
| CN | 105208849 B | 2/2018 |

(Continued)

OTHER PUBLICATIONS

"Calmer BT Chopper and Residue Management Upgrade Kits and Components", https://calmercornheads.com/bt.chopper-upgrade-kits/, 19 pages, accessed Mar. 26, 2020.

(Continued)

*Primary Examiner* — Adam J Behrens
(74) *Attorney, Agent, or Firm* — McKee, Voorhees & Sease, PLC

(57) ABSTRACT

A stalk roll having twelve flutes extending radially from the main cylinder along the length of the main cylinder. Within the row unit opposing stalk rolls cooperate to engage and capture the corn stalk, thereafter, controlling and processing the corn stalk. The flutes may be configured with differing edges to facilitate control and movement of the stalk to the point of ear separation within the row unit. The flutes may be configured such that opposing compressive forces acting on the exterior of the stalk at approximately 180° of separation operate to implode the stalk while sharp edges on the flutes operate to cut the stalk into small segments which are deposited on the ground for decomposition.

19 Claims, 12 Drawing Sheets

(56) References Cited

U.S. PATENT DOCUMENTS

| | | |
|---|---|---|
| 1,558,774 A | 10/1925 | Barnes |
| 1,717,305 A | 6/1929 | Beckman |
| 1,827,216 A | 10/1931 | Synck |
| 1,894,412 A | 1/1933 | Neighbour |
| 1,964,579 A | 6/1934 | Hyman |
| 2,264,565 A | 12/1941 | Coultas et al. |
| 2,333,901 A | 11/1943 | Swenson |
| 2,379,822 A | 7/1945 | Mitchell et al. |
| 2,456,404 A | 12/1948 | Good |
| 2,491,195 A | 12/1949 | Messenger et al. |
| 2,527,786 A | 10/1950 | Barkstrom |
| 2,534,665 A | 12/1950 | Greeley |
| 2,534,685 A | 12/1950 | Shrader |
| 2,575,120 A | 11/1951 | Peel |
| 2,604,750 A | 7/1952 | Fergason |
| 2,616,236 A | 11/1952 | Hartley |
| 2,768,626 A | 10/1956 | Pelowski |
| 2,825,195 A | 3/1958 | Smith |
| 2,826,031 A | 3/1958 | Hanson |
| 2,870,593 A | 1/1959 | Anderson |
| 2,899,794 A | 8/1959 | Hadley |
| 2,934,877 A | 5/1960 | Fowler |
| 2,961,820 A | 11/1960 | Hadley |
| 3,101,579 A | 8/1963 | Karisson et al. |
| 3,101,720 A | 8/1963 | Karlsson |
| 3,174,484 A | 3/1965 | Anderson |
| 3,222,852 A | 12/1965 | Ward et al. |
| 3,304,702 A | 2/1967 | Russell |
| 3,462,928 A | 8/1969 | Schreiner et al. |
| 3,496,708 A | 2/1970 | Bornzin |
| 3,517,490 A | 6/1970 | Mathews |
| 3,520,121 A | 7/1970 | Ashton et al. |
| 3,524,308 A | 8/1970 | Spry |
| 3,524,309 A | 8/1970 | Bartlett |
| 3,528,233 A | 9/1970 | Martner et al. |
| 3,528,234 A | 9/1970 | Kowalik et al. |
| 3,584,444 A | 6/1971 | Sammann et al. |
| 3,585,789 A | 6/1971 | Blanshine et al. |
| 3,589,110 A | 6/1971 | Schreiner et al. |
| 3,599,409 A | 8/1971 | Whitney et al. |
| 3,633,348 A | 1/1972 | Sears et al. |
| 3,646,737 A | 3/1972 | Grant |
| 3,705,481 A | 12/1972 | Willet |
| 3,705,485 A | 12/1972 | Toomer |
| RE27,554 E | 1/1973 | Ashton et al. |
| 3,707,833 A | 1/1973 | Sutton |
| 3,736,733 A | 6/1973 | Fell et al. |
| 3,737,676 A | 6/1973 | Fletcher et al. |
| 3,759,021 A | 9/1973 | Schreiner et al. |
| 3,831,356 A | 8/1974 | Maiste et al. |
| 3,832,836 A | 9/1974 | Anderson |
| 3,858,384 A | 1/1975 | Maiste et al. |
| 3,885,375 A | 5/1975 | Solterbeck |
| 3,961,466 A | 6/1976 | Martin et al. |
| 3,982,385 A | 9/1976 | Hyman |
| 4,084,396 A | 4/1978 | Fritz et al. |
| 4,086,749 A | 5/1978 | Greiner et al. |
| 4,106,270 A | 8/1978 | Weigand et al. |
| 4,106,271 A | 8/1978 | Carey et al. |
| 4,115,983 A | 9/1978 | Barnes et al. |
| 4,219,990 A | 9/1980 | Hill |
| 4,227,366 A | 10/1980 | Pucher |
| 4,233,804 A | 11/1980 | Fischer et al. |
| 4,244,162 A | 1/1981 | Pucher |
| 4,266,392 A | 5/1981 | Knepper et al. |
| 4,327,544 A | 5/1982 | McDuffie et al. |
| 4,333,304 A | 6/1982 | Greiner et al. |
| RE31,063 E | 10/1982 | Greiner et al. |
| RE31,064 E | 10/1982 | Shriver |
| 4,377,062 A | 3/1983 | Slattery |
| 4,429,516 A | 2/1984 | Erickson |
| 4,434,606 A | 3/1984 | Rhodes et al. |
| 4,445,314 A | 5/1984 | Gust |
| 4,531,351 A | 7/1985 | Sousek |
| 4,598,535 A | 7/1986 | Sousek |
| 4,612,757 A | 9/1986 | Halls et al. |
| 4,771,592 A | 9/1988 | Krone et al. |
| 4,845,930 A | 7/1989 | Dow |
| 5,009,061 A | 4/1991 | Heuling |
| 5,040,361 A | 8/1991 | Briesemeister |
| 5,060,464 A | 10/1991 | Caron |
| 5,161,356 A | 11/1992 | Pick |
| 5,269,126 A | 12/1993 | Kalverkamp |
| 5,282,352 A | 2/1994 | Schoolman |
| 5,330,114 A | 7/1994 | Trenkamp et al. |
| 5,404,699 A | 4/1995 | Christensen |
| 5,464,371 A | 11/1995 | Honey |
| 5,528,887 A | 6/1996 | Nagy et al. |
| 5,680,750 A | 10/1997 | Shefl |
| 5,704,202 A | 1/1998 | Calmer |
| 5,775,076 A | 7/1998 | Mossman |
| 5,784,869 A | 7/1998 | Rayfield |
| 5,787,696 A | 8/1998 | Wiegert et al. |
| 5,799,483 A | 9/1998 | Voss et al. |
| 5,878,559 A | 3/1999 | Cooksey et al. |
| 5,878,560 A | 3/1999 | Johnson |
| 5,878,561 A | 3/1999 | Gunn |
| 5,881,541 A | 3/1999 | Silver et al. |
| 5,884,464 A | 3/1999 | McMillen |
| 5,911,673 A | 6/1999 | Johnson |
| 5,924,269 A | 7/1999 | McMillen |
| 5,934,054 A | 8/1999 | Landeis |
| 6,009,061 A | 12/1999 | Davis et al. |
| 6,050,071 A | 4/2000 | Bich et al. |
| 6,116,005 A | 9/2000 | Chamberlain |
| 6,216,428 B1 | 4/2001 | Becker et al. |
| 6,226,969 B1 | 5/2001 | Becker |
| 6,237,312 B1 | 5/2001 | Becker |
| 6,237,314 B1 | 5/2001 | Boll |
| 6,330,782 B1 | 12/2001 | Digman et al. |
| 6,412,259 B1 | 7/2002 | Wiegert |
| 7,104,038 B2 | 9/2006 | Calmer |
| 7,237,373 B2 | 7/2007 | Resing et al. |
| 7,373,767 B2 | 5/2008 | Calmer |
| 7,716,908 B2 | 5/2010 | Christensen et al. |
| 7,788,890 B2 | 9/2010 | Cressoni |
| 7,874,134 B1 | 1/2011 | Hoffman |
| 7,886,510 B2 | 2/2011 | Calmer |
| 7,992,371 B2 | 8/2011 | Rieck et al. |
| 8,171,708 B2 | 5/2012 | Calmer |
| 8,196,380 B2 | 6/2012 | Carboni |
| 8,220,237 B1 | 7/2012 | Calmer |
| 8,371,914 B2 | 2/2013 | Cressoni |
| 8,464,505 B1 | 6/2013 | Calmer |
| 8,857,139 B1 | 10/2014 | Calmer |
| 8,863,487 B2 | 10/2014 | Calmer |
| 9,554,511 B1 | 1/2017 | Calmer |
| 9,560,804 B1 | 2/2017 | Calmer |
| 9,668,414 B2 | 6/2017 | Calmer |
| D803,271 S | 11/2017 | Fredricks et al. |
| 10,038,232 B2 | 7/2018 | Dang et al. |
| 10,039,232 B2 | 8/2018 | Calmer |
| 10,045,483 B2 | 8/2018 | Calmer |
| 10,172,286 B2 | 1/2019 | Schloesser et al. |
| 10,334,783 B2 | 7/2019 | Walker et al. |
| 10,420,281 B2 | 9/2019 | Calmer |
| 10,537,058 B2 | 1/2020 | Ehle |
| 10,785,911 B2 * | 9/2020 | Calmer ............... A01D 45/025 |
| 10,874,052 B2 | 12/2020 | Gramm et al. |
| 11,032,971 B2 | 6/2021 | Coon |
| 11,277,968 B2 | 3/2022 | Brammeier |
| 2003/0172639 A1 | 9/2003 | Calmer |
| 2004/0016219 A1 | 1/2004 | Calmer |
| 2004/0123577 A1 | 7/2004 | Resing et al. |
| 2005/0120695 A1 | 6/2005 | Calmer |
| 2006/0174603 A1 | 8/2006 | Mossman |
| 2007/0180806 A1 | 8/2007 | Calmer |
| 2007/0266689 A1 | 11/2007 | Calmer |
| 2008/0156446 A1 | 7/2008 | Sekiya |
| 2009/0025353 A1 | 1/2009 | Christensen et al. |
| 2010/0043371 A1 | 2/2010 | Rieck et al. |
| 2010/0071336 A1 | 3/2010 | Christensen et al. |
| 2010/0072036 A1 | 3/2010 | Brown |
| 2010/0218474 A1 | 9/2010 | Calmer |

(56) References Cited

U.S. PATENT DOCUMENTS

| | | |
|---|---|---|
| 2011/0011048 A1 | 1/2011 | Hoffman |
| 2011/0146217 A1 | 6/2011 | Carboni |
| 2011/0146218 A1 | 6/2011 | Carboni |
| 2012/0291410 A1 | 11/2012 | Silver et al. |
| 2014/0182255 A1 | 7/2014 | Calmer |
| 2016/0174461 A1 | 6/2016 | Walker et al. |
| 2016/0174462 A1 | 6/2016 | Walker |
| 2016/0174463 A1 | 6/2016 | Barry |
| 2016/0338268 A1 | 11/2016 | Calmer |
| 2017/0055447 A1 | 3/2017 | Missotten et al. |
| 2017/0055449 A1 | 3/2017 | Missotten et al. |
| 2017/0188517 A1 | 7/2017 | Schloesser et al. |
| 2017/0196168 A1 | 7/2017 | Ricketts et al. |
| 2018/0168103 A1* | 6/2018 | Calmer .................. A01D 47/00 |
| 2018/0242524 A1 | 8/2018 | Baye et al. |
| 2018/0352740 A1 | 12/2018 | Albinger et al. |
| 2019/0230859 A1 | 8/2019 | Walker et al. |
| 2020/0000036 A1 | 1/2020 | Coon et al. |
| 2020/0236854 A1 | 7/2020 | Tiessen et al. |

FOREIGN PATENT DOCUMENTS

| | | |
|---|---|---|
| DE | 3612224 A1 | 10/1987 |
| DE | 19855526 C1 | 6/2000 |
| DE | 102005054998 A1 | 5/2007 |
| DE | 102011118207 A1 | 5/2013 |
| EP | 0846409 A1 | 6/1998 |
| EP | 943229 A1 | 9/1999 |
| FR | 2599931 A1 | 12/1987 |
| FR | 2784263 A1 | 4/2000 |
| WO | 0030427 A1 | 6/2000 |
| WO | 2012152866 A1 | 11/2012 |
| WO | 2017023851 A1 | 2/2017 |

OTHER PUBLICATIONS

International Search Report and Written Opinion in PCT/US2013/072635, 9 pages, mailed Mar. 20, 2014.
Search Report and Written Opinion, for PCT/US2014/024716, dated Jul. 7, 2014.
RowMax Stalk Rolls, John Deere website, 6 pages, Dec. 2020.
Allis-Chalmers, compiled by Alan C. King, "An Informal History" 62 pages, 1918-1960.
Installation and Operating Instructions-Model 402, 303, 304 & 404 Corn Head p. 28-30 2017.
International Operator's Manual 800 Series Corn Heads, p. 14-15, International Harvestor Co. 1978.
"Corn Head Parts", p. 60, JD Harvest Parts Catalog for year 2016.
RowMax, "Trigger a Chain Reaction", p. 32, JD Winter parts catalog for year 2018.
Operator's Manual, "International 234 Sweet Corn Harvester", p. 7-15 International Harvestor, 1969.
Operator's Manual, "International 700 Series Corn Heads for 815 and 915 Combines", p. 8-9, IHC, 1973.
Operator's Manual, "John Deere No. 227 Corn Picker Two-Row Mounted", p. 13-15, p. 21-24, 2017.
Operator's Manual, "McCormick International 234 Corn Harvestor", p. 8-9, McCormick Int. 1966.
The Old and the New in Corn Culture, Yearbook of the United States Departement of Agriculture. 2017.
"Calmer BT Chopper and Residue Management Upgrade Kits and Components", https://calmercornheads.com/bt.chopper-upgrade-kits/, 19 pages, accessed Mar. 26, 2020.
360 Yield Center, "Instructions 360 Chainroll", John Deere 600 Series 2012+, 7 pages, 2017.
Pre-Delivery Instructions, "John Deere 210 Corn Attachment", p. 37-38, John Deere. 1963.

* cited by examiner

TWELVE BLADED STALK ROLL

CROSS REFERENCE TO RELATED APPLICATIONS

This is a continuation patent application which claims priority under 35 U.S.C. § 120 to U.S. Ser. No. 16/789,147, filed Feb. 12, 2020, which is a continuation of U.S. Ser. No. 29/680,011, filed Feb. 12, 2019, now U.S. Pat. No. D1,023,700, issued Apr. 23, 2024: both of which are hereby incorporated by reference in their entireties herein, including without limitation, the specification, claims, and abstract, as well as any figures, tables, appendices, or drawings thereof.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX

Not Applicable

TECHNICAL FIELD

The apparatus described herein is generally applicable to the field of agricultural equipment. The embodiments shown and described herein are more particularly for improved harvesting of corn plants.

BACKGROUND

The speed employed in corn harvesting has contributed to increased complexity and performance demands on harvesting equipment. This speed of operation results in (1) an increased rate of ear separation: (2) an increased rate of stalk ejection from the row unit; and (3) an increased volume of plant material entering the corn head for processing. This increased volume makes it more difficult for the corn head to retain minimal amounts of material other than ears ("MOTE") and, also, to adequately lacerate, cut, and/or penetrate the shell of the stalk to expose the internal portions for accelerated decomposition of the stalk.

As shown in FIG. 1, modern corn headers are provided with a plurality of row crop dividers for retrieving, lifting, and directing the rows of stalks into each row unit positioned within the corn head. Within the row unit each stalk is guided to the corn plant engagement point which is defined herein as the portion of the corn head row unit that makes initial contact with the stalk as a part of the capture process whereby the stalk is controlled within the row unit for further processing.

FIG. 1A shows the top view of two stalk rolls found in the prior art. Gathering chains located in the corn plant engagement chamber draw the stalks and/or ears towards the header. Once the stalk is captured, stalk rolls located beneath the gathering chains pull the stalks rapidly downward, returning the stalk to the field. These stalk rolls are typically powered by a gearbox. As the stalk rolls rotate, the flutes on the stalk rolls engage and pull the stalks downward. Two stripper plates located above the stalk rolls, with one stripper plate on either side of the corn row; are spaced wide enough to allow the stalks and leaves to pass between them but narrow enough to retain the ears. This causes the ears to be separated from the corn plant as the stalk is pulled down through the stripper plates. The stalk rolls continue to rotate and eject the unwanted portions of the corn plant below the corn plant engagement chamber, thereby returning the unwanted portions of the corn plant to the field.

FIG. 2 shows a profile of the row unit as found in existing corn head assemblies.

The performance of stalk rolls found in the prior art, as shown in FIGS. 3-5, has been found to be less than optimal, particularly in the area of processing the remaining stalk so as to facilitate rapid decomposition and to eliminate large stalk pieces littering the field which may adversely impact planting and impede emergence of the following year's crop.

FIG. 3 shows prior art opposing stalk roll designs utilizing six flutes that inter-mesh and overlap. When the flutes of this type engage the stalk, the flutes alternately apply opposing force. This knife-edge relationship causes at least two problems. First, the corn plants are violently tossed from side to side, referred to as stalk whipping, causing premature separation of loosely attached ears or fracture of the stalk, thereby permitting the ear to fall to the ground and become irretrievable. Second, the stalk is cut or snapped at a node causing long, unwanted portions of the stalk and leaves to stay attached to the ear and remain in the row unit. This increases the amount of MOTE the harvesting machine must process. This problem is compounded as the number of row units per corn head is increased.

FIG. 4 shows the prior art stalk roll design with inter-meshing knife edges as described in U.S. Pat. No. 5,404,699. As shown, the stalk rolls have six outwardly extending integral flutes. This design, upon restricted engagement of the stalk roll with the stalk, allows the knife edges to cut stalks before pulling the stalks through the stripper plates to separate the ear from the stalk, effectively leaving the upper portion of the corn plant free to float in the corn row unit as shown in FIG. 3. This requires the harvesting machine threshing components to process a substantial portion of the stalk, which increases harvesting machine horsepower and fuel requirements.

FIG. 5 shows the design disclosed by U.S. Pat. No. 6,216,428, which is a stalk roll having bilaterally symmetric flutes with knife edges that are adjacent and overlap in the shear zone area. This design produces a shearing and cutting of the stalk using a scissor configuration produced by the leading and trailing edges of the opposing knife-edged flutes. Again, the stalks are cut off prior to ear separation. This is sometimes referred to as a "scissor effect" and also results in the need to process increased amounts of MOTE.

FIG. 6 is a row unit from U.S. Pat. No. 3,271,940 with a cut-away section showing the connection between the stalk rolls shafts to gears within the gearbox with the stalk rolls extending outwardly therefrom.

The present invention is a twelve bladed stalk roll which works cooperatively with an opposing stalk roll during corn harvest to facilitate the capture of the corn stalk and the processing of the stalk thereby imploding the stalk at the point of capture and thereafter continuing to implode the stalk while also chopping it into small pieces which are deposited on the ground for rapid decomposition. The stalk rolls of the present invention are significantly more aggressive in the chopping the stalk into smaller pieces for rapid decomposition and ready integration into the ground due to the employment of twelve flutes in contrast to prior art stalk rolls using six, eight or ten flute configurations. This aggressive destruction of the stalk is further aided by the engagement of the stalk within the engagement area of the two stalk rolls which operates to readily implode the stalk at twelve separate locations per revolution of the stalk rolls as the stalk is being pulled downwardly and moves rearwardly as it is processed within the row unit.

An essential problem presented by increasing the number of flutes on the stalk roll to twelve is nose deflection. This is also known as spreader load. The present invention overcomes this mechanical disadvantage to produce an efficient component tool which contributes substantially to residue management.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 1A is an exploded top view of a portion of one row unit of FIG. 1 of the prior art showing a portion of the corn plant engagement chamber.

DETAILED DESCRIPTION

Figure 1:
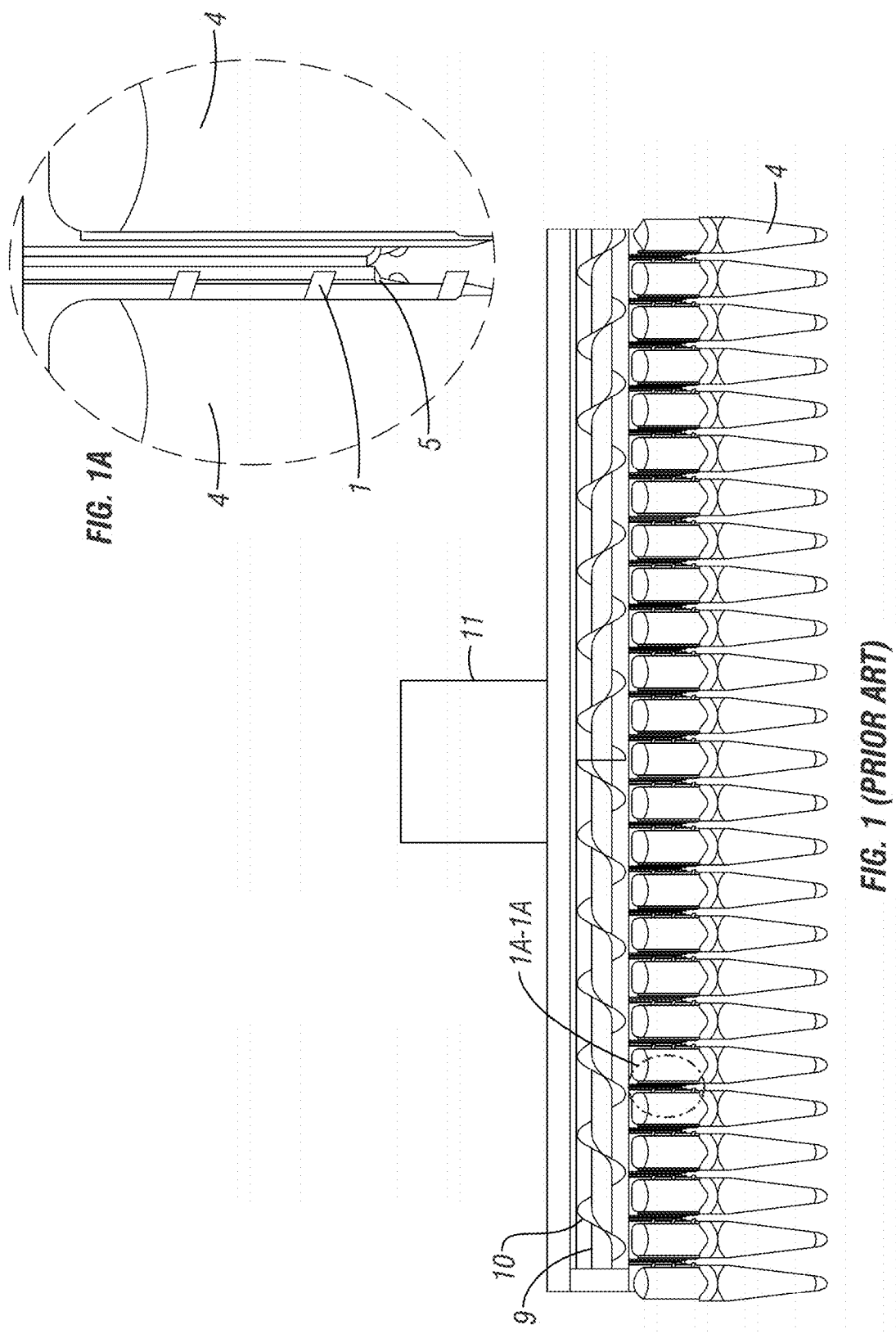
FIG. 1 is a top view of one embodiment of a corn head that contains a cross auger, a feeder house, a frame, and multiple row units of the prior art.
Figure 2:
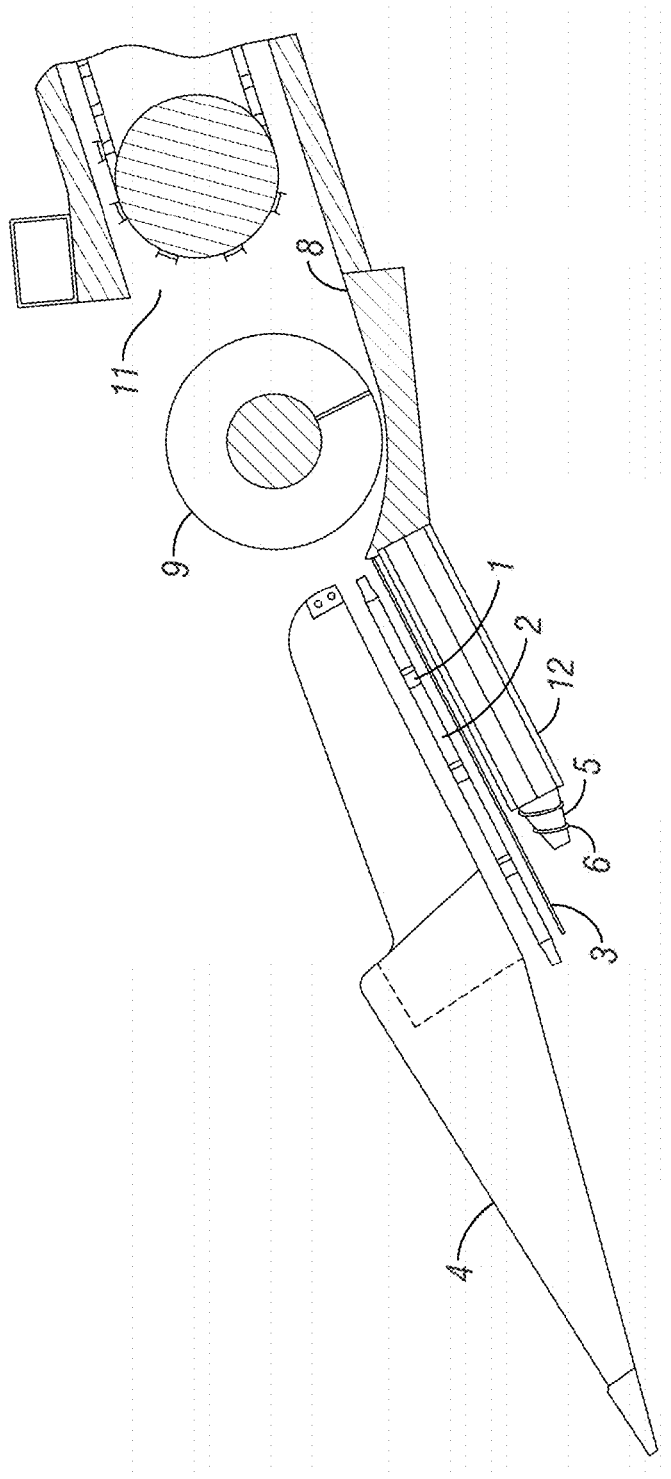
FIG. 2 is a cross-sectional view along the plane of A-A of one row unit, the cross auger, the cross-auger trough, the feeder house, and the gathering chain from FIG. 1, as disclosed in the prior art.
Figure 3:
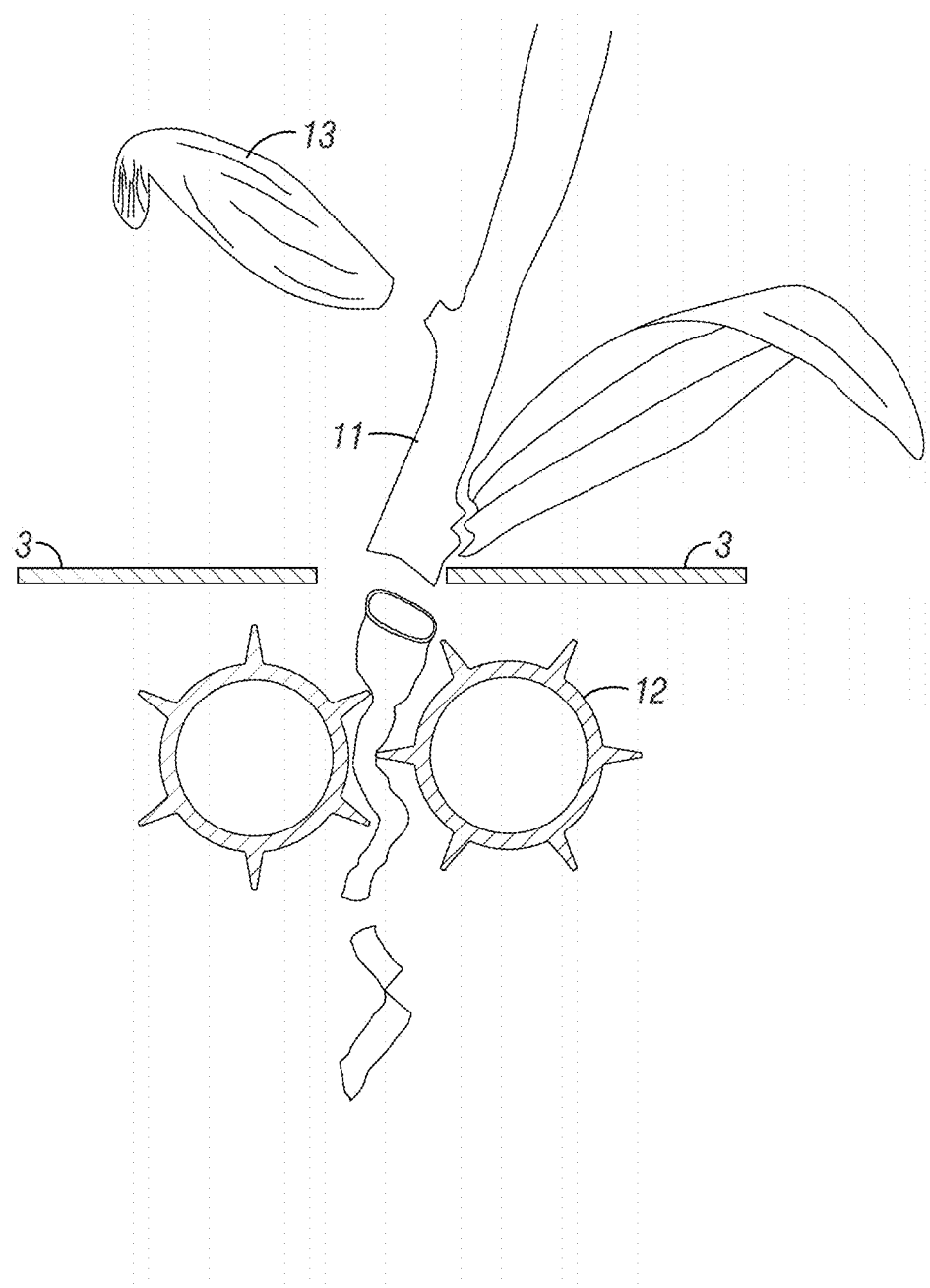
FIG. 3 is a cross-sectional view of a portion of the corn head shown in FIG. 1 along the plane F highlighting the stalk rolls and stripper plates of one row unit of the prior art engaged with and shearing a corn plant.
Figure 4:
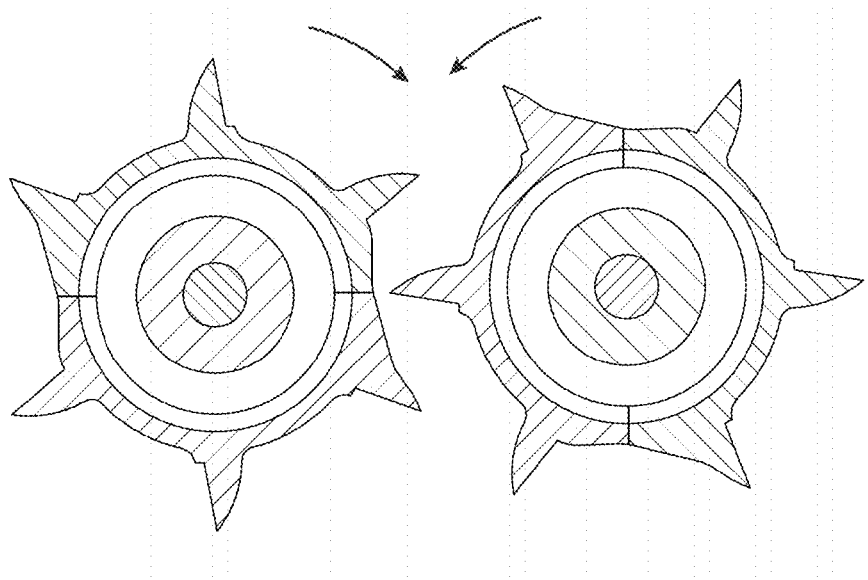
FIG. 4 is an end view of a pair of cutting-type stalk rolls as disclosed in the prior art.
Figure 5:
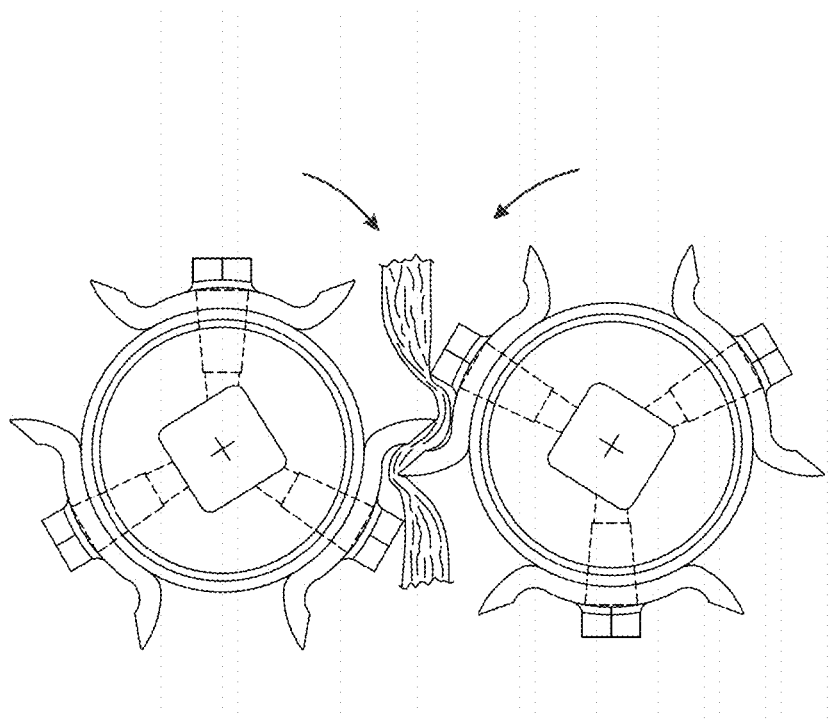
FIG. 5 is an end view of a pair of shearing-type stalk rolls as disclosed in the prior art.
Figure 6:
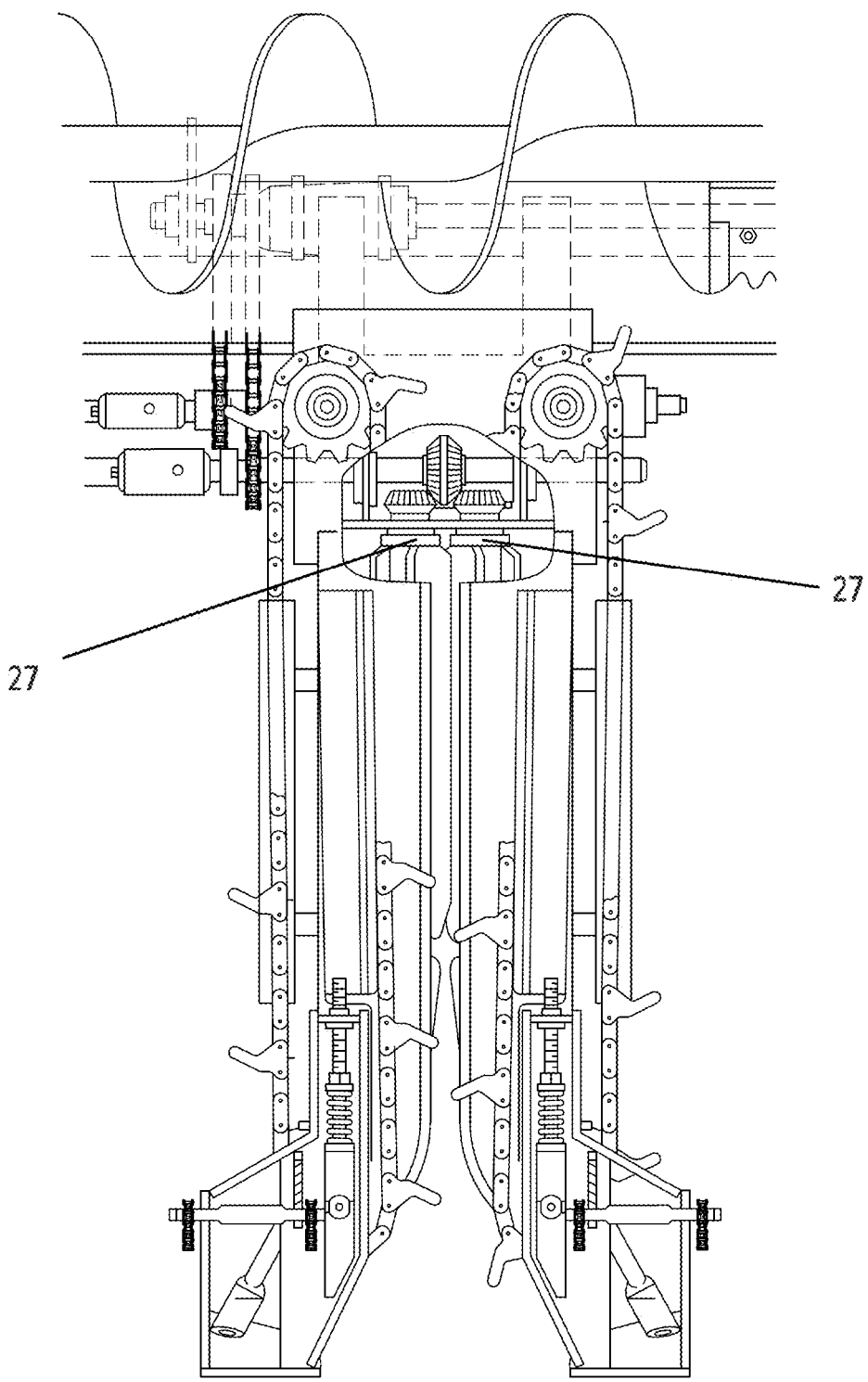
FIG. 6 is an overhead view of a row unit of a corn header with a cutaway view of the geared intersection of the stalk rolls and the gearbox as disclosed in prior art.
Figure 7:
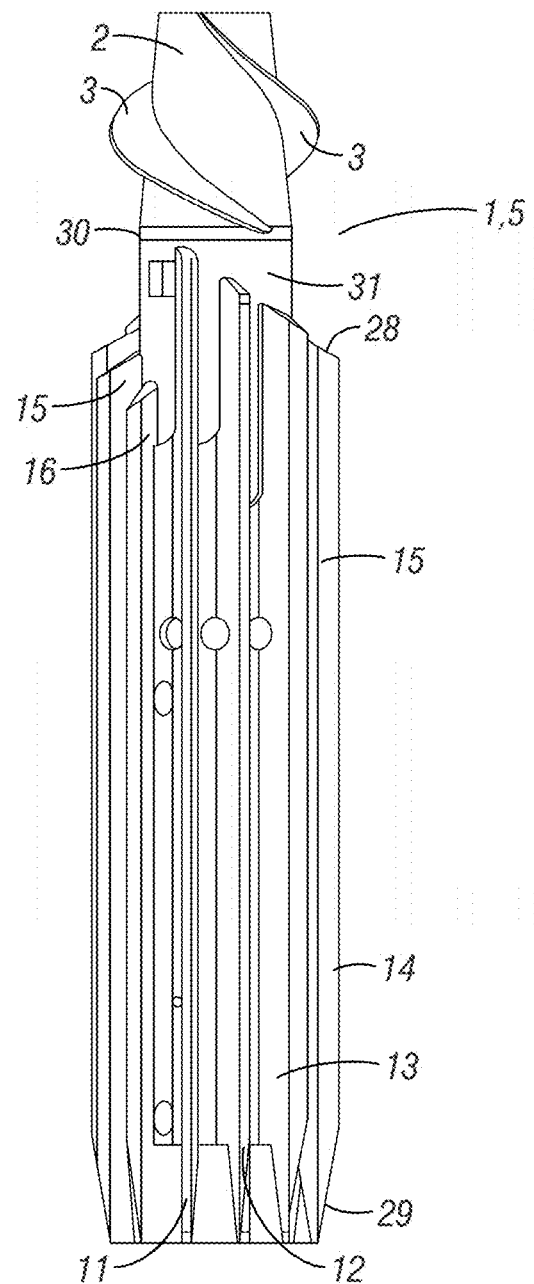
FIG. 7 is a perspective view of the right stalk roll of an illustrative embodiment of the present invention.
Figure 8:
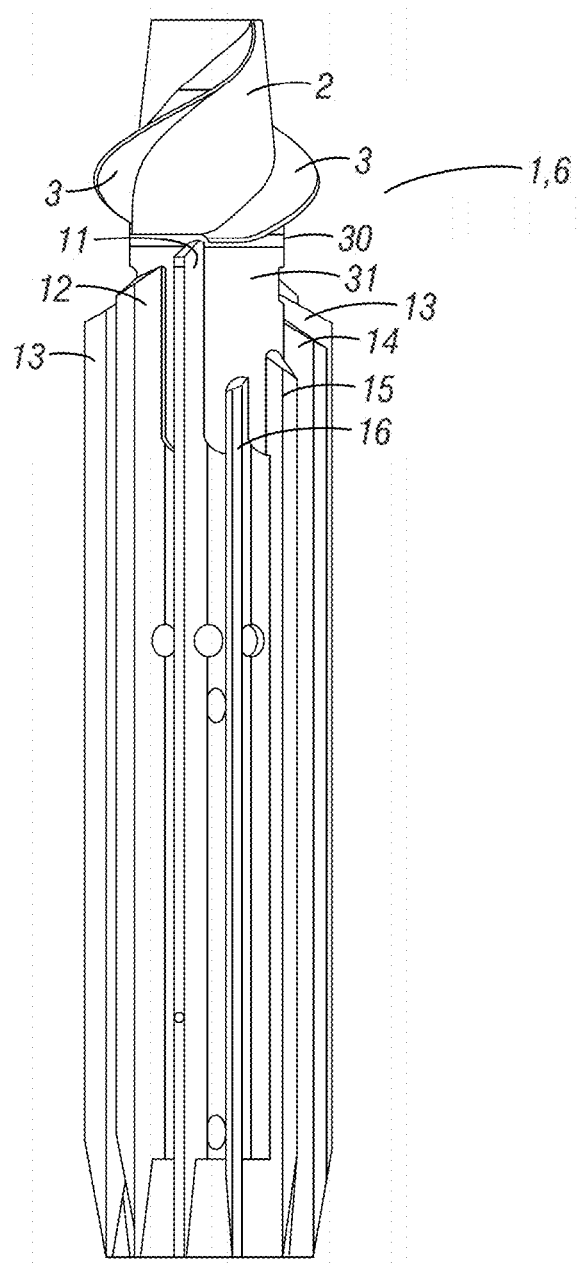
FIG. 8 is a perspective view of the left stalk roll of an illustrative embodiment of the present invention.
Figure 9:
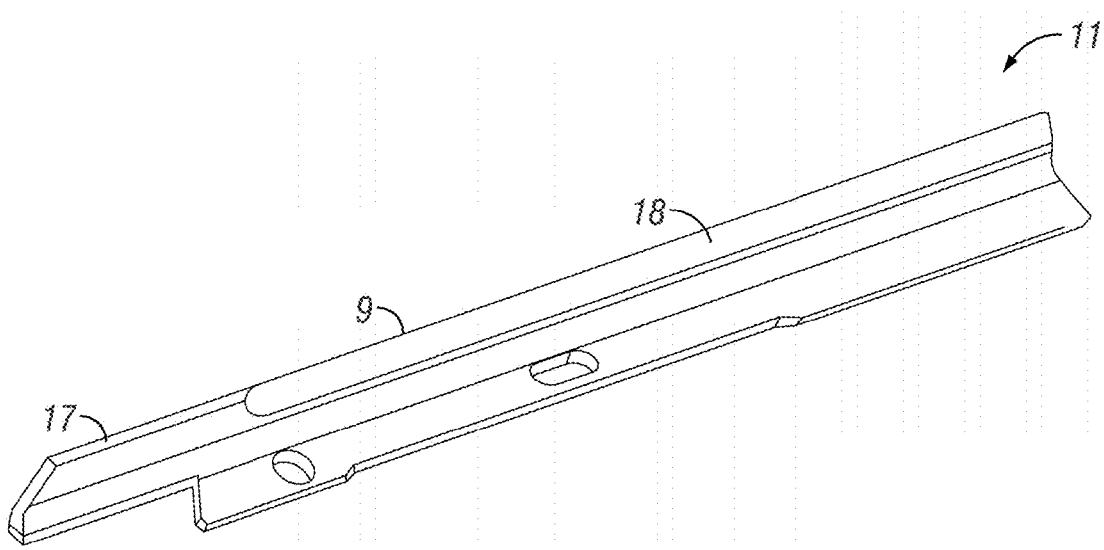
FIG. 9 is a view of a hybrid flute as used in embodiments of the present invention.
Figure 10:
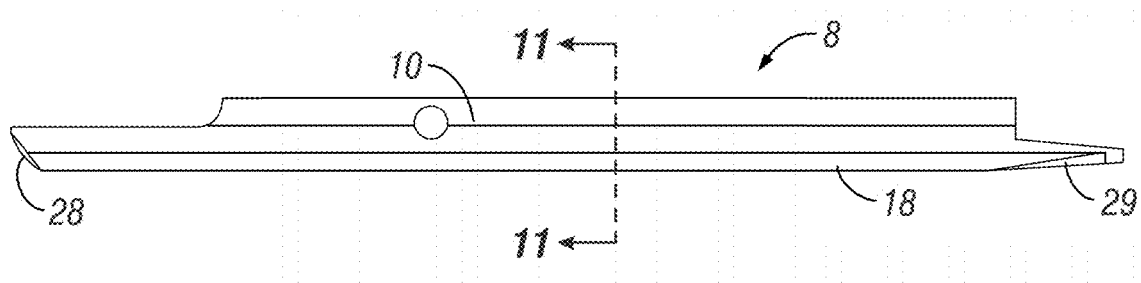
FIG. 10 is a perspective view of a flute as used in embodiments of the present invention.
Figure 11:
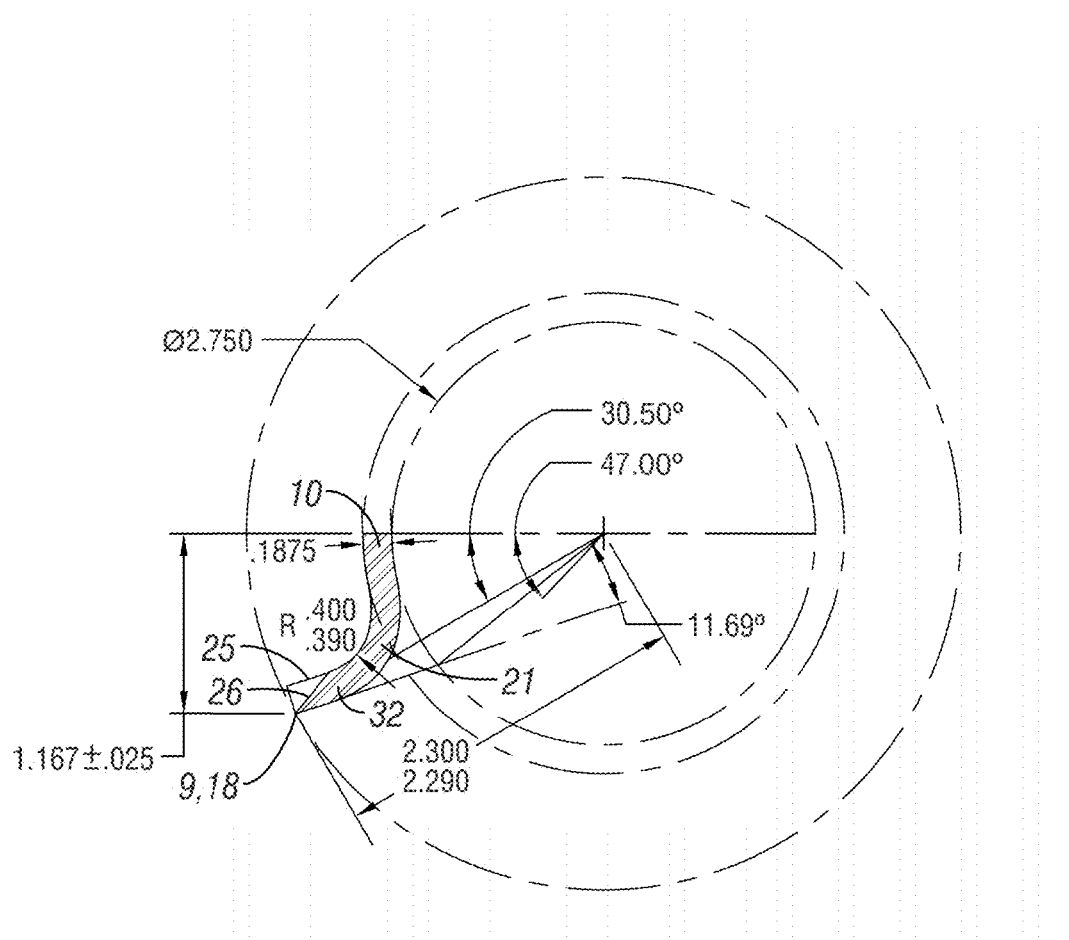
FIG. 11 is a cross-sectional view of a flute having a sharp edge as used in embodiments of the present invention.
Figure 12:
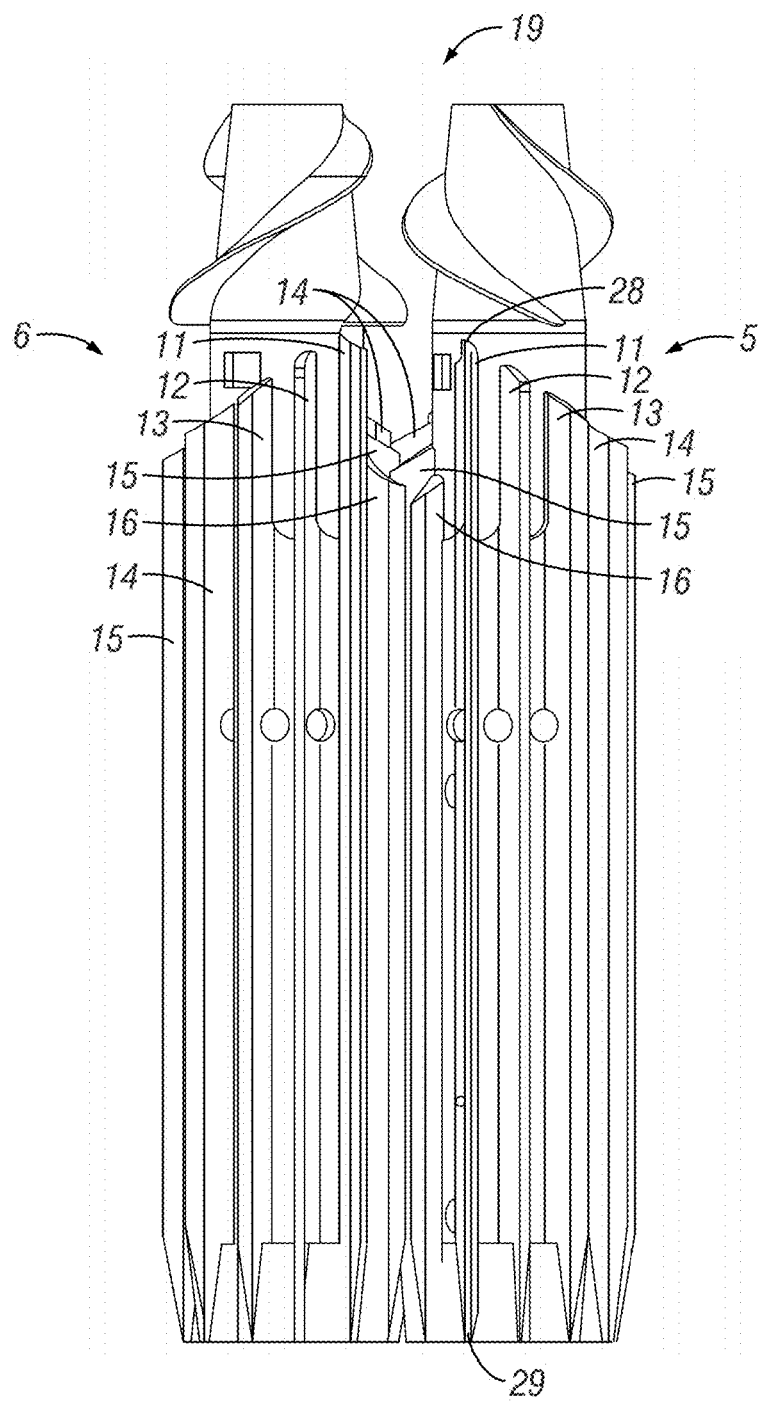
FIG. 12 is a perspective view of a pair opposing of stalk rolls incorporating certain aspects of the present disclosure as used in embodiments of the present invention.

In the present specification the methods and apparatuses are not limited to specific methods, specific components, or to particular implementations. Terminology used herein is for the purpose of describing particular embodiments and is limiting as to the scope of the present invention.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. "Stalk roll" and "flute", when generally used herein, are not limited to any specific aspect, feature, and/or configuration thereof, and may include any stalk roll having one or more inventive feature disclosed herein unless so indicated in the following claims.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

The present invention is a stalk rolls 1 which functions as an opposing pair 19 as a component part within a corn header containing row units which is equipment utilized in the harvest of corn. Each row unit on a corn header is provided with a first and second stalk roll 5, 6 arranged parallel to one another in an opposing pair 19 configuration. As used herein, when referring to stalk rolls 1, the terms "left" and "right" are defined from the perspective of a corn plant with respect to a harvesting machine. The stalk rolls 1 are positioned on drive shafts 27 which are connected and powered through a gearbox, all as described in the prior art and is well known to those skilled in the art and not pictured herein.

Stalk rolls 1 play an integral role in the harvest of the corn ear from the corn plant and the preparation of the field for the following year's crop. This role calls for the opposing stalk rolls 19 within the row unit to capture the corn plant stalk, draw it downwardly resulting in ear separation from the stalk, and prepare the stalk for decomposition in the field after harvest as it is ejected from each row unit.

Stalk rolls 1 can be an impediment to the harvest of the corn ear. If the opposing pair of stalk rolls 19 do not engage and capture the corn stalk, the forward movement of the combine will operate to sheer the stalk resulting in the stalk and appended corn ear to fall to the ground and evade harvest. Once captured by the stalk rolls 1, the counterrotation may result in stalk whipping with such violence so as to result in breakage or sheering of the stalk or premature separation of the corn ear, again resulting in the ear evading harvest. The present invention employs twelve flutes 8. Each of these flutes has a leading end 28 which is positioned nearer the nose cone, and each has a trailing end 29 which is positioned adjacent or nearly adjacent to the gearbox. The use of twelve flutes 8 provides smoother engagement and capture of the stalk and to reduce stalk whipping as compared to stalk rolls employing a lesser number of flutes 8, thus reducing loss of yield for the farmer.

In the present invention, the first and second stalk rolls 5, 6 are provided with nose cones 2 having transport vanes 3. The nose cones 2 are positioned at the leading end 30 of the stalk rolls. Immediately behind the nose cones 2 are twelve flutes 8. The flutes 8 are positioned adjacent to one another forming a 360° circumferential enclosure referred to as the main cylinder 7. Each of the flutes 8 are secured to the hub 4.

Within the row unit, the stalk rolls 1 frequently are not affixed to a frame or other stabilizing structure at or near the leading end where the nose cone 2 is positioned. The only fixation and, thus, stability for the stalk roll is on the shaft which is operably connected within the gearbox. The impact of this configuration is to increase the moment arm thereby increasing the loading upon the connecting end of the shaft which increased loading is transferred to the gear box. As the corn stalk enters the row unit and engages the stalk rolls 1, it occupies a certain area. As the stalk contacts the flutes 8, it operates to deflect or push against the edge 9 of the flutes 8, thus outwardly deflecting the stalk rolls 1. This action is referred to as nose deflection or spreader load. The result of spreader load is to increase the forces acting at the intersection of the shaft with the gear box assembly. If the force is excessive, the primary result is gear box failure due to premature wear or breakage.

Figure 14:
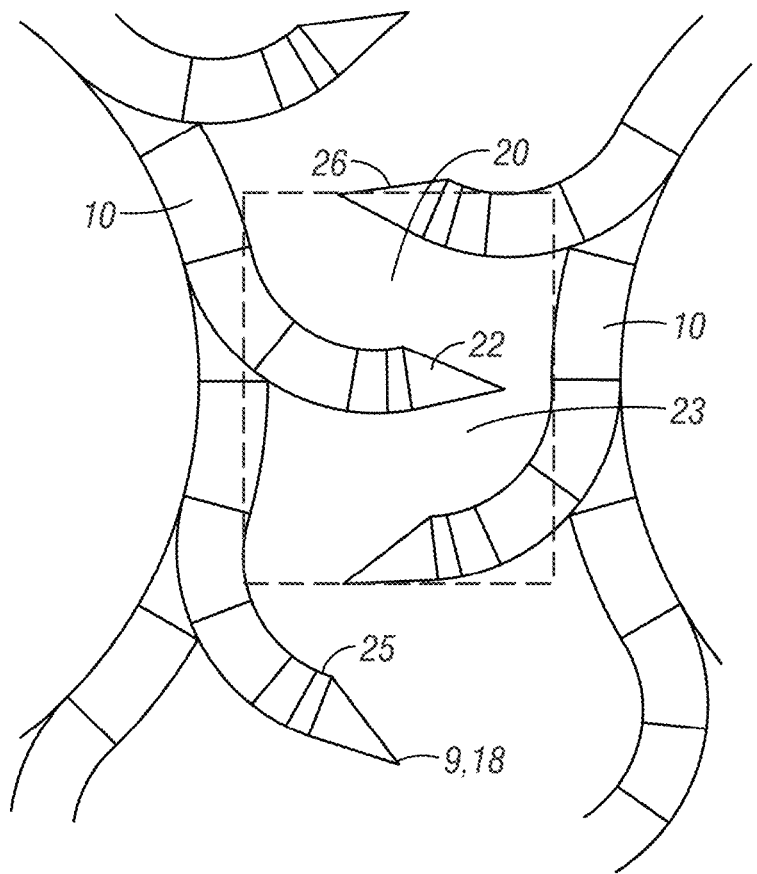
FIG. 14 is an enhanced view showing the process area formed by the counter-rotation action of a pair of opposing stalk rolls such as disclosed in FIG. 13.

Utilizing twelve flutes on a stalk roll operates to reduce the area between the flutes, referred to as the processing area 20, as shown on FIG. 14. In the counterrotation action of the opposing stalk rolls 19 whereby the flutes 1 overlap, this further reduces unoccupied space within the processing area 20 which is available to accommodate the presence of the stalk. The reduced size of the processing area 20 increases spreader load acting upon the stalk rolls 1. The present invention addresses and overcomes the adverse results associated with this increased spreader load.

In one embodiment, the present invention utilizes twelve flutes of equal length. In another embodiment, the present invention utilizes flutes of at least two differing lengths.

In one embodiment of the present invention, a main cylinder 7 mounted along the length of the first and second stalk rolls 5, 6 is formed by the flute base 10 of each of the twelve flutes 1 affixed to the hub 4.

In one embodiment, the main cylinder 7 is formed by the hybrid flutes 11, reduced flutes 12, second reduced flutes 13, third reduced flutes 14, fourth reduced flutes 15, and short flutes 16. Each flute 11, 12, 13, 14, 15, 16 may further be provided with a sharp edge 18. The sharp edges 18 are substantially parallel to the central longitudinal axis of the main cylinder 7.

In certain embodiments, the trailing end 29 of the flutes 8 are aligned with one another resulting in a staggered terminus of the leading end 28 of the flutes thereby creating an opening 31 formed between the leading end 28 of the flutes 8 and the nose cone 3.

As with corn headers employing stalk rolls of the prior art, the stalk rolls 5, 6 of the present disclosure pull the corn stalk in a downward motion, causing the corn ear to contact the stripper plates within the row unit and separate from the stalk.

In one embodiment of the present invention, a hybrid flute 11 on each stalk roll 1 operates as the first flute 8 to engage the corn stalk. The hybrid flute 11 is fitted with a blunt edge 17 at its leading end, the end nearest to the nose cone 2. The opposing pair of stalk rolls 19 are mounted within the row unit so that the opposing hybrid flutes 11 make first contact with the stalk with their respective blunt edges 17. In this embodiment, the first contact by the blunt edges 17 of the hybrid flute 11 operates to pinch without cutting the stalk thereby gaining control of the stalk, also referred to as capturing the stalk. This pinching action further operates to implode the stalk at capture because the point of first contact with the stalk is nearer to the 3 and 9 o'clock positions as opposed to the 11 and 1 o'clock positions as found in prior art stalk rolls. The use of the blunt edges 17 is preferred to the sharp edges 18 because the latter can partially or completely cut the stalk causing it to fall out of the corn header thereby losing the corn ear and reducing the harvest of the farmer. As the stalk proceeds deeper into the row unit, the action of the flutes 8 counterrotating to contact the stalk pull the stalk downwardly. Thereby, flutes 12, 13, 14, 15, 16 affixed to the stalk rolls 5, 6 also act to lacerate and implode the stalk, further facilitating ejection of the stalk pieces from the row unit.

Figure 13:
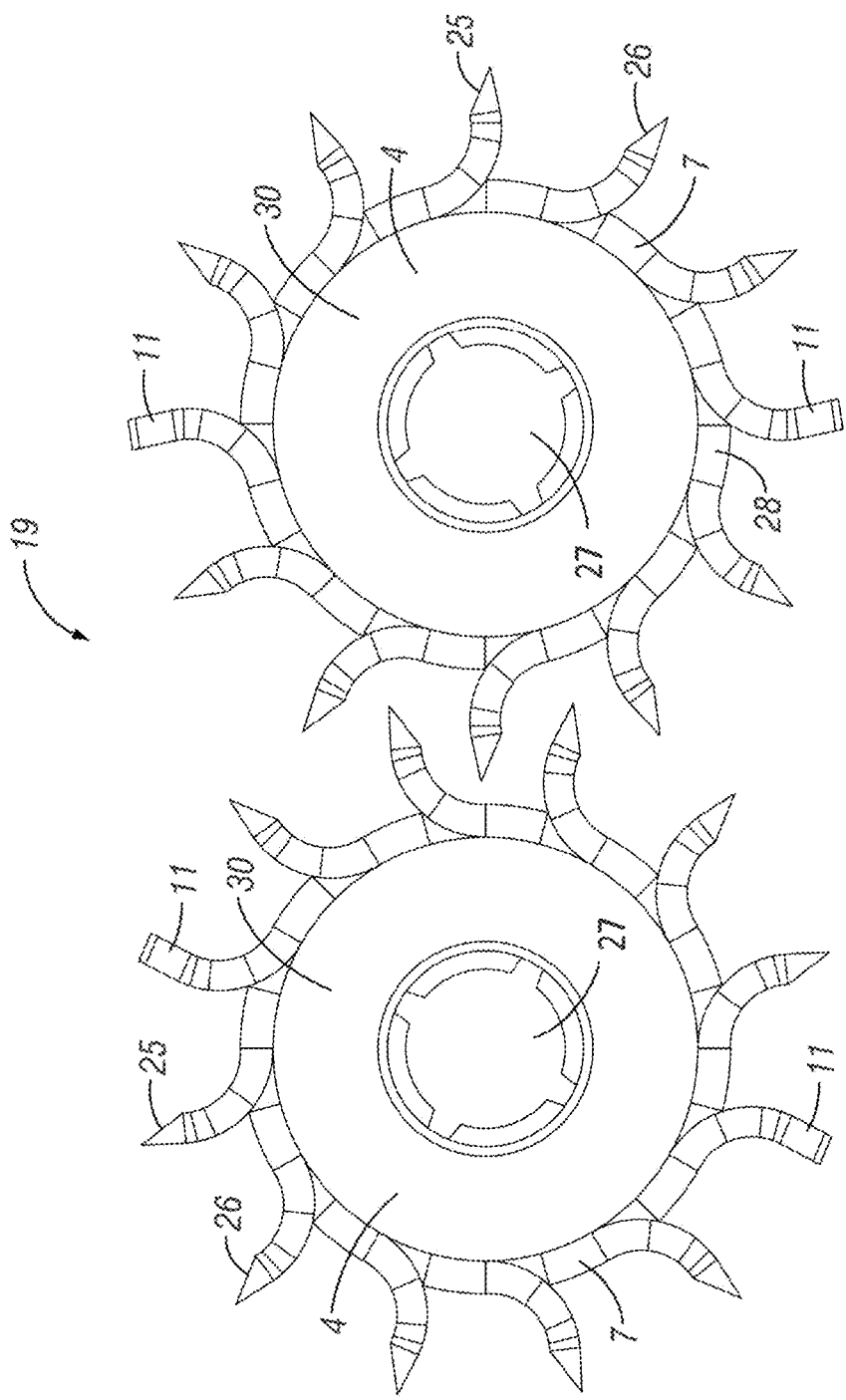
FIG. 13 is a view of the leading end of a pair of opposing stalk rolls such as disclosed in FIG. 12 with the nose cone removed.

As shown in FIGS. 13 and 14, in one embodiment, the majority of the blade 22 of the flute 1 must be in the center of the opposing valley 23. This embodiment functions to further reduce deflection resulting from the mass of the corn stalk occupying the opposing valley 23 and thereby decreasing spreader load.

In various embodiments, the flute edge segment 32 is not perpendicular (90°) from the surface of the main cylinder 7 but is positioned at a greater degree. In said embodiments, the flute edge segment 32 of the flute 8 is positioned in relation to positioning the point of the sharp edge 18 on the center line of the opposing valley 23 when the stalk rolls function as an opposing pair 19. In one embodiment, the flute edge segment 32 is bent ranging from 90°-120° in relation to the main cylinder 7. In another embodiment, the flute edge segment 32 is bent to a position ranging from 95°-118°. In a further embodiment, the flute edge segment 32 is bent ranging from 100°-115°. In yet another embodiment, the flute edge segment 32 is bent ranging from 111°-113°. The degree of the bend of the flute edge segment 32 is based upon the position of the back side of the flute edge segment 32, which is the side opposite of the blade 22 taper, in relation to the point on the main cylinder 7. In operation, by angling the flute edge segment 32 as noted above functions to create equal unoccupied space on each side of the flute edge segment 32 within the opposing valley 23 of the stalk roll pair 19 so as to accommodate the mass of the stalk and reduce stresses placed upon the flute 8, including weld deflection when the flutes are affixed to the hub 4 by welding, thus operating to reduce spreader load.

In one embodiment, the blade 22 is sharpened to a configuration having an angle ranging from 30°-45°. In another embodiment, the angle of the blade ranges from 35° to 40°. In a further embodiment, the angle of the blade ranges from 37°-38°. The impact of using these blade angles operates to reduce the stress is imparted to the corn stalk which otherwise would result in a higher incidence of stalk sheer or breakage. Further, with this configuration of the blade angle, as the opposing stalk rolls 19 counter-rotate in operation, the heel 25 of the blade taper 26 on each of the opposing stalk rolls 19 leads and makes first contact with the stalk. This functions to first pinch the stalk operating to implode the stalk by the application of opposing pincher action as the continued rotation of the opposing stalk rolls 19 brings the sharp edge 18 of the blade 22 into contact with the stalk whereby the cutting of the stalk occurs.

In embodiments of the present invention, the blades 22 of the twelve flutes 8 so oriented so as to cut the corn stalk into approximately 1" long segments of stalk which are linearly shredded by the implosive action created by heel 25 contact. In these embodiments, another feature of heel 25 first contact with the stalk is a self-sharpening action of the blade 22.

What is claimed is:

1. A twelve bladed stalk roll:
a main cylinder;
six pairs of two flutes symmetrically and radially arrayed about the main cylinder; each of the six pairs of two flutes having: (1) different total lengths, (2) a blade defined by a leading end and a trailing end, whereby the trailing end of the flutes are all positioned in relative alignment to one another in forming the main cylinder and (3) a blade taper with a heel;
wherein each of the six pairs of two flutes has a flute edge segment that is not perpendicular from the surface of the main cylinder, the flute edge segment having (i) a back side opposite the blade taper (ii) a position in relation to a point of a sharp edge on a center line of an opposing valley of an opposing twelve bladed stalk roll, the opposing twelve bladed stalk roll having features that mirror features of the twelve bladed stalk roll, (iii) a bend based upon the position in relation to the point on the main cylinder;
a support member engaged with the main cylinder; and
a nose cone positioned at the leading end.

2. The stalk roll according to claim 1 wherein the support member accepts and transfers rotational movement to the main cylinder.

3. The stalk roll of claim 1, wherein the main cylinder comprises a counterrotation action to reduce unoccupied space in a processing area between each of the twelve flutes during operation which thereby causes an increased spreader load.

4. The stalk roll of claim 3, wherein the processing area is sized to cut a corn stalk into approximately 1" long segments of stalk which are linearly shredded by the implosive action created by a contact with the heel of the blade taper.

5. The stalk roll of claim 4, wherein the contact with the heel of the blade taper causes a self-sharpening action of the blade that sharpens the blade to an angle of 30° to 45°.

6. The stalk roll of claim 5, wherein the contact with the heel of the blade taper causes a self-sharpening action of the blade that sharpens the blade to an angle of 35° to 40°.

7. The stalk roll of claim 3, wherein a majority of the blade of each of the twelve flutes is in a center of the opposing valley to withstand the increased spreader load.

8. The stalk roll of claim 1 wherein at least one of the six pairs comprises hybrid flutes, wherein the hybrid flutes have a blunt edge beginning at its leading end and the hybrid flutes have the sharp edge adjacent to the blunt edge.

9. The stalk roll of claim 8 wherein at least one of the six pairs comprises first reduced flutes.

10. The stalk roll of claim 9 wherein at least one of the six pairs comprises second reduced flutes.

11. The stalk roll of claim 10 wherein at least one of the six pairs comprises third reduced flutes.

12. The stalk roll of claim 11 wherein at least one of the six pairs comprises fourth reduced flutes.

13. The stalk roll of claim 12 wherein at least one of the six pairs comprises short flutes.

14. The stalk roll of claim 1 whereby the leading end of the flutes forms an opening.

15. The stalk roll of claim 14 wherein the opening has a floor comprised of an exposed hub.

16. The stalk rolls of claim 1 wherein an edge of the flutes extends perpendicular from the main cylinder.

17. The stalk rolls of claim 1 whereby the flute edge segment extends at an angle between 90° and 120° from perpendicular to the main cylinder.

18. The stalk roll of claim 17 wherein the flute edge segment extends at an angle of between 93° and 110° from perpendicular to the main cylinder.

19. The stalk roll of claim 18 wherein the flute edge segment extends at an angle of 95° and 100° from perpendicular to the main cylinder.

* * * * *